United States Patent [19]

Asada et al.

[11] Patent Number: 5,420,744
[45] Date of Patent: May 30, 1995

[54] MULTILAYERED CERAMIC CAPACITOR

[75] Inventors: Eiichi Asada, Tokyo; Kazurou Nagashima, Fukuoka, both of Japan

[73] Assignee: Shoei Chemical Inc., Tokyo, Japan

[21] Appl. No.: 124,889

[22] Filed: Sep. 21, 1993

[30] Foreign Application Priority Data

Oct. 9, 1992 [JP] Japan .................................. 4-310734

[51] Int. Cl.$^6$ .............................................. H01G 1/01
[52] U.S. Cl. .................................................. 361/305
[58] Field of Search ............................ 361/303–305; 29/25.42; 75/338, 343, 355

[56] References Cited

U.S. PATENT DOCUMENTS

| | | | |
|---|---|---|---|
| 3,663,667 | 5/1972 | Cheney et al. | 264/14 |
| 3,763,409 | 10/1973 | Sheard | 317/258 |
| 3,815,187 | 6/1974 | Hanold, III | 29/25.42 |
| 4,520,422 | 5/1985 | Borland | 361/305 |
| 4,778,517 | 10/1988 | Kopatz | 264/10 |

FOREIGN PATENT DOCUMENTS

| | | |
|---|---|---|
| 62-001807 | 1/1987 | Japan . |
| 63-31522 | 6/1988 | Japan . |
| 2057623 | 2/1990 | Japan . |
| 3059905 | 3/1991 | Japan . |
| 3-68484 | 10/1991 | Japan . |
| 1461176 | 1/1977 | United Kingdom . |

*Primary Examiner*—Bruce A. Reynolds
*Assistant Examiner*—Michael D. Switzer
*Attorney, Agent, or Firm*—Flynn, Thiel, Boutell & Tanis

[57] ABSTRACT

A multilayered ceramic capacitor having internal electrodes comprising a substantially single-crystal metallic powder as a conductor, the powder having been produced by spraying a solution containing at least one metal salt to form droplets and heating the droplets to a temperature higher than the decomposition temperature of the metal salt and the melting point of the metal. When the metal salt forms an oxide at a temperature not higher than the melting point of the metal, the droplets are heated to a temperature higher than the decomposition temperature of the oxide. The multilayered capacitor is free from generated cracks in the ceramic material.

7 Claims, 1 Drawing Sheet

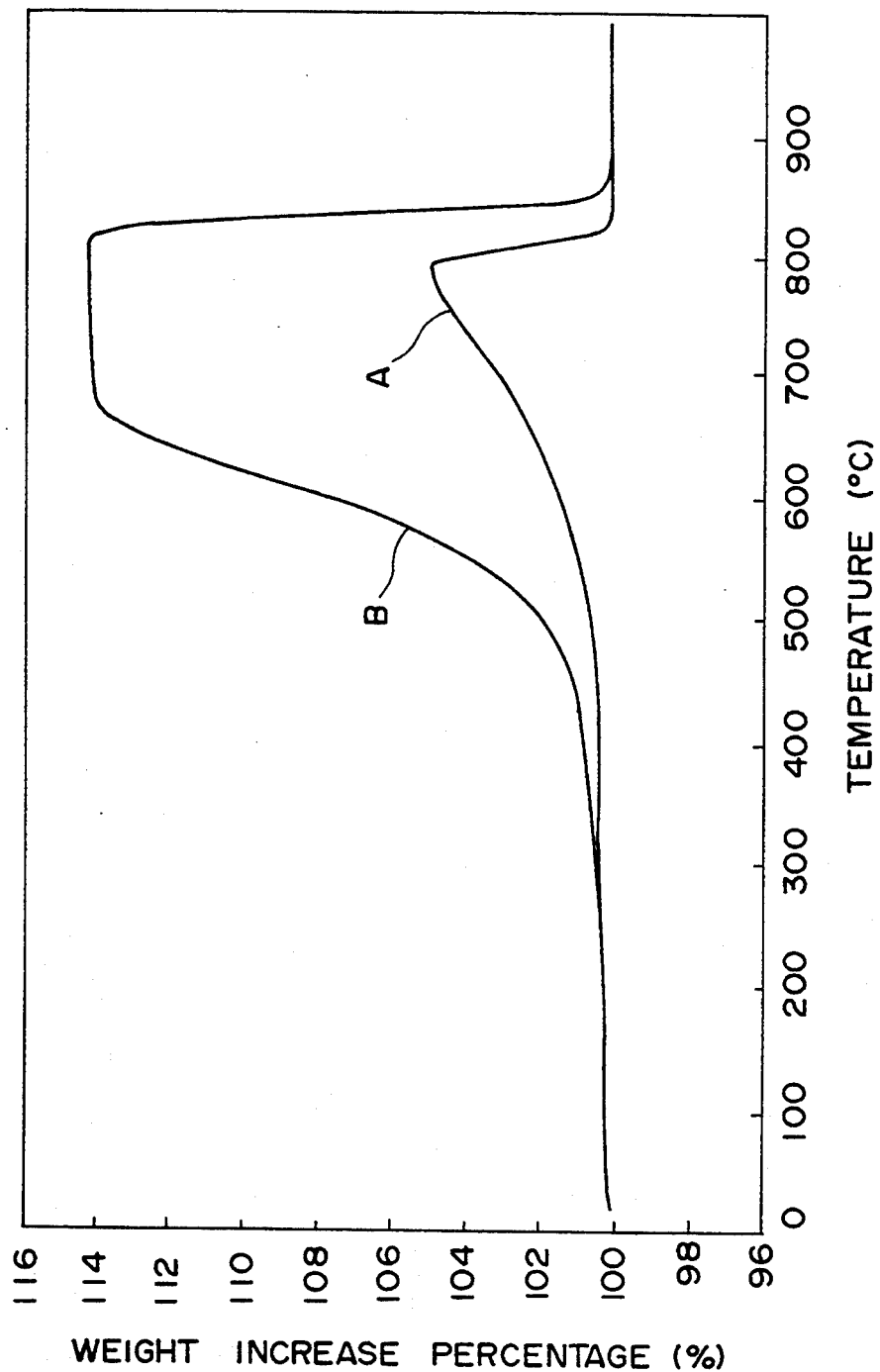

MULTILAYERED CERAMIC CAPACITOR

BACKGROUND OF THE INVENTION

1. Field of the Invention

The present invention relates to a multilayered ceramic capacitor to be used in the electronics field.

2. Description of the Prior Art

A multilayered ceramic capacitor has heretofore been produced by forming internal electrodes comprising a metallic powder as a conductor on ceramic green sheets, laminating the resultant sheets and firing the laminated sheets. As the conductive powder for the internal electrodes, a noble metal, such as palladium (Pd) or silver (Ag), nickel (Ni), copper (Cu) or the like is usually used, since it is fired at a temperature as high as 1000° C. or above. However, such a metallic conductive powder that it undergoes volume expansion due to oxidation during firing, thereby generating cracks in the ceramic material. As described, for example, in Japanese Patent Publication No. 936/1981, Pd powder begins oxidation and expansion at about 500° C., which is lower than the sintering temperature of the ordinary ceramics, reaches a maximum oxidation rate at about 800° C. and thereafter is rapidly reduced to return to the original Pd at 850° C. In particular, fine Pd powder has a high oxidation activity and oxidizes almost completely to cause an increase in its weight by about 15%. Since the ceramic material is poor in strength due to insufficient sintering at a temperature as low as 600° to 700° C., the oxidation and reduction of the internal electrodes have readily caused such structural defects as cracks and delamination.

The generation of cracks is further accelerated by an increase in the number of the multilayered ceramic layers, since this increase is accompanied by a decrease in the thickness of the ceramic layer and an increase in the number of electrodes.

Various attempts have been made to prevent the generation of cracks by the regulation of the particle size of the metallic powder, oxidation treatment or surface treatment of the powder, compounding of additives, and the like. However, an urgent requirement in recent years for the size reduction and capacitance enhancement of capacitors has resulted in decreases in the thickness of the ceramic layer and the internal electrode layer and in the areas thereof and an increase in the number of laminated layers, thus making it difficult to eliminate the above-mentioned defects, especially the cracks by the conventional methods.

SUMMARY OF THE INVENTION

The present invention provides a multilayered ceramic capacitor which has a high capacitance and is free from the generation of cracks in the ceramic material.

The present invention relates to:

(1) a multilayered ceramic capacitor having internal electrodes comprising a substantially single-crystal metallic powder as a conductor, the powder having been produced by spraying a solution containing at least one metal salt to form droplets and heating the droplets to a temperature higher than the decomposition temperature of the metal salt and the melting point of the metal, (2) the capacitor according to item (1) wherein, when the metal salt forms an oxide at a temperature not higher than the melting point of the metal, the droplets are heated to a temperature higher than the decomposition temperature of the oxide to give a substantially single-crystal metallic powder as the conductor, (3) the capacitor according to item (1) or (2) wherein the metal salt is a mixture of at least two metal salts and the conductor is formed from an alloy, (4) the capacitor according to any of items (1) through (3) wherein the metal salt is at least one member selected from among palladium, silver, nickel and copper salts, and (5) the capacitor according to any of items (1) through (4) wherein the metal salt is at least one member selected from among palladium, silver, nickel and copper nitrates.

BRIEF DESCRIPTION OF THE DRAWING

The single figure is a graph showing the relation between the volume increase rate and the temperature for with an example according to the present invention and a comparative example, in which curve A shows the weight increase in the example according to the present invention and curve B shows the weight increase in the comparative example.

DETAILED DESCRIPTION OF THE PREFERRED EMBODIMENTS

The metallic powder to be employed as a conductor in the present invention includes Pd, Ag, Ni and Cu, which have heretofore been used as the conductive components of the internal electrodes for capacitors. The metallic powder as mentioned in the present invention is meant to include single metal powder, alloy powder and mixtures thereof.

A process for producing the substantially single-crystal powder to be used in the present invention is described in Japanese Patent Publication No. 31522/1988. The metal salt may be of any kind so long as it can deposit the objective metal by pyrolysis and is exemplified by nitrates, sulfates, chlorides, ammonium salts, phosphates, carboxylates, alcoholates and resinate of each metal in question. One or more of these metal salts are dissolved in water, an organic solvent such as alcohol, acetone or ether or a mixture of these solvents to form a solution of the metal salt or salts. A single metal powder is produced from a solution of a single metal salt, and an alloy powder can be produced from a solution of salts of at least two alloying metals. A mixed powder may be produced from at least two non-alloying metals. A spherical, single-crystal metallic powder having a smooth surface can be produced by spraying a metal salt solution with an atomizer to form droplets and then heating the droplets to a temperature higher than the decomposition temperature of the metal salt and the melting point of the metal. When the metal salt forms an oxide at a temperature not higher than the melting point of the metal, the droplets are heated to a temperature higher than the decomposition temperature of the oxide.

Detailed investigation was made by the present inventors on the oxidation behavior of conductors, especially Pd powder. The Pd powder which has heretofore been used as an internal electrode has mainly been produced by chemical reduction. Even when the Pd powder consists of monodispersed fine spherical particles having a particle size of about 1 μm, it has an internal structure of polycrystalline particles composed of about 30-nm crystallites. In the case of such polycrystalline particles, oxygen diffuses inside not only through the particle surface but also through grain boundaries at an extremely high diffusion rate. It is conceivable, therefore, that when Pd powder is heated during firing at a temperature rise rate of 10° C./min, it is almost completely oxidized at 800° C. and is expanded to a great extent, thus generating cracks. Such an oxidative expansion takes place similarly in conductive metals other than Pd, such as Ag, Ni and Cu.

The powder used for the internal electrode as the conductor according to the present invention consists of substantially single-crystal particles, which are different from the previous polycrystalline particles. Thus, it is characterized in that it is free from grain boundaries and brings about only bulk diffusion of oxygen through the particle surface, thereby minimizing its expansion due to oxidation. The use of such single crystal particles as the internal electrode can reduce the volume expansion of the multilayered capacitors during firing, for example, about 0.2% at the maximum for Pd in terms of linear expansion in the direction of the capacitor plane. This value is one-third or less of 0.6%, which is attained with the conventional capacitor with minimized expansion. It is conceivable that the reduced expansion suppresses the generation of cracks and, even when the ceramic layer is thin or highly laminated, the generation of cracks is minimized.

In order to assure favorable conductivity when the internal electrode layers are thin for the purpose of reducing the capacitor size, it is necessary to use fine metallic powder of 1 μm or small in particle size. However, there has been a limit to the thinning the thin layer of electrodes in the conventional method, since oxidation is accelerated with a decrease in particle size to increase the generation of cracks, thus making it impossible to employ fine powders. In the present invention, however, the generation of cracks is minimized, even when powder with such a small particle size is employed. Accordingly, the use of Pd powder with a particle size of 1 μm or larger in the conventional method has limited the electrode layer thickness to at least 1.5 mg/cm$^2$ of electrode in terms of coating weight. On the other hand, the use of fine powder with a particle size of 1 μm or smaller, which becomes possible by the single-crystal powder according to the present invention, can attain favorable conductivity even with a thin layer of 1 mg/cm$^2$ or less, thus enabling the size reduction of capacitors by thinning the electrode layers.

Now the present invention will be described with reference to examples.

EXAMPLE 1

A 1 mol/l aqueous solution of palladium nitrate was sprayed into fine droplets, which were introduced into a furnace heated to 1650° C. and passed therethrough after a retention time sufficient to decompose the palladium-containing droplets and to heat the resultant Pd particles up to a temperature higher than the melting point thereof. As a result of observation of the monodispersed Pd particles thus formed with an X-ray diffractometer and a high-resolution SEM (scanning electron microscope), the Pd particles proved to be fine particles with a 0.5 to 1.0 μm particle size substantially in a state of a single crystal. The TG (thermo-gravimetry) curve of the powder was determined at a temperature rise rate of 10° C./min by the use of a thermal analyzer. The result is given as curve A in the figure, which indicates a slight increase in weight with 4.7% at the maximum.

Then, 100 parts by weight of the powder was mixed with 90 parts by weight of a vehicle comprising ethyl-cellulose, and the mixture was made into a paste by means of a three-roll mill. The resultant paste was printed onto a ceramic green sheet comprising barium titanate as the primary ingredient, followed by drying. 60 pieces of the printed sheets were laminated and hot-pressed at 60° C. and 100 kg/cm$^2$ to provide a green chip of a multilayered ceramic capacitor, which was subsequently fired in the air over a total firing time of 14 hours, including for 2 hours at a peak temperature of 1350° C., to provide a multilayered ceramic capacitor. The resultant capacitor was entirely free from cracks or delamination.

EXAMPLE 2

A green chip of a multilayered ceramic capacitor was produced in the same manner as that of Example 1 except that nickel nitrate was employed in place of the palladium nitrate. Subsequently, it was maintained in the air at 400° C. for 1 hour and, then, fired in an atmosphere of nitrogen gas containing trace hydrogen gas over a total firing time of 14 hours, including 2 hours at a peak temperature of 1350° C., to provide a multilayered ceramic capacitor containing Ni internal electrodes. The resultant capacitor was entirely free from cracks or delamination.

COMPARATIVE EXAMPLE 1

Hydrazine as the reducing agent was added to an aqueous palladium salt solution containing palladium chloride as the starting material to produce monodispersed Pd particles of 0.5 to 0.6 μm particle size. As the result of observation of the particles with an X-ray diffractometer and a high-resolution SEM, the Pd particles proved to be polycrystalline particles comprising crystallites up to about 30 nm in size. The TG curve of the powder was determined at a temperature rise rate of 10° C./min by the use of a thermal analyzer. The result is given as curve B in the Figure, which indicates an extremely great increase in weight, with 14.6% at the maximum.

Then, the powder was made into a multilayered ceramic capacitor in the same manner as that of the Examples. As a result, large cracks were found throughout the capacitor, making the capacitor unserviceable.

COMPARATIVE EXAMPLE 2

Powder obtained by reducing nickel acetate with ethylene glycol was made into a multilayered ceramic capacitor in the same manner as that of Example 2. As a result, cracks were found throughout the capacitor.

The present invention exhibits such an effect that a capacitor can be provided with a multilayered structure by the use of a specific conductive powder, while suppressing the volume expansion due to oxidation and preventing the generation of cracks in the ceramic material.

What is claimed is:

1. A multilayered ceramic capacitor having internal electrodes comprising a substantially single-crystal, spherical metallic powder as a conductor, said powder having been produced by spraying a solution containing at least one metal salt to form droplets and heating said droplets to a temperature higher than the decomposition temperature of said metal salt and the melting point of said metal.

2. A capacitor according to claim 1, wherein, when the metal salt forms an oxide at a temperature not higher than the melting point of said metal, the droplets are heated to a temperature higher than the decomposition temperature of said oxide to give a substantially single-crystal metallic powder as the conductor.

3. A capacitor according to claim 1, wherein the metal salt is a mixture of at least two metal salts and the conductor is one formed from an alloy.

4. A capacitor according to claim 1, wherein the metal salt is at least one member selected from among palladium, silver, nickel and copper salts.

5. A capacitor according to any of claim 4, wherein the metal salt is at least one member selected from among palladium, silver, nickel and copper nitrates.

6. A multilayered ceramic capacitor having internal electrodes comprising a substantially single-crystal, spherical metallic powder of a metal selected from the group consisting of nickel and palladium as a conductor, said powder having been produced by spraying a solution containing at least one metal salt of said metal to form droplets and heating said droplets to a temperature higher than the decomposition temperature of said metal salt and the melting point of said metal.

7. A capacitor according to claim 1, wherein the electrodes have a thickness no greater than 1 mg/cm$^2$ in terms of coating weight.

* * * * *